United States Patent [19]

Dearman

[11] Patent Number: 4,586,647
[45] Date of Patent: May 6, 1986

[54] PIPE CLAMPS

[76] Inventor: Timothy C. Dearman, 3002 S. Main St., P.O. Box 937, Pearland, Tex. 77581

[21] Appl. No.: 514,105

[22] Filed: Jul. 15, 1983

[51] Int. Cl.$^4$ .............................................. B23K 37/04
[52] U.S. Cl. ..................................... 228/49.3; 269/91
[58] Field of Search ............... 228/44.5, 49 B; 261/91, 261/93

[56] References Cited

U.S. PATENT DOCUMENTS

| | | | |
|---|---|---|---|
| 1,825,207 | 9/1931 | Roberts | 269/91 |
| 2,803,277 | 8/1957 | Gamura | 269/93 |
| 3,467,295 | 9/1969 | Watson | 228/49 B |
| 3,593,402 | 7/1971 | Mori | 228/49 B X |
| 3,653,574 | 4/1972 | Dearman | 228/49 B |
| 3,705,453 | 12/1972 | Olson | 228/49 B X |
| 3,944,202 | 3/1976 | Dearman | 228/49 B X |
| 3,952,936 | 4/1976 | Dearman | 228/49 B |

OTHER PUBLICATIONS

"Dearman Attachable Reforming Jack Bar," from 1981 Dearman Catalog, p. 27 (see item 10"20'-444).

Primary Examiner—Kenneth J. Ramsey
Attorney, Agent, or Firm—Learman & McCulloch

[57] ABSTRACT

A clamp for facilitating the welding of two pipe sections end-to-end comprises a clamp encircling one of the pipe sections adjacent one end thereof and a plurality of jacks removably secured to the clamp circumferentially of the latter. Each jack includes a pair of legs which straddle the clamp and terminate at corresponding ends in grippers which forcibly engage the clamp. The grippers are movable toward and away from each other so as to engage and disengage the clamp and thereby enable a jack to be located at any selected position on the clamp without necessitating any adjustment of the latter.

20 Claims, 13 Drawing Figures

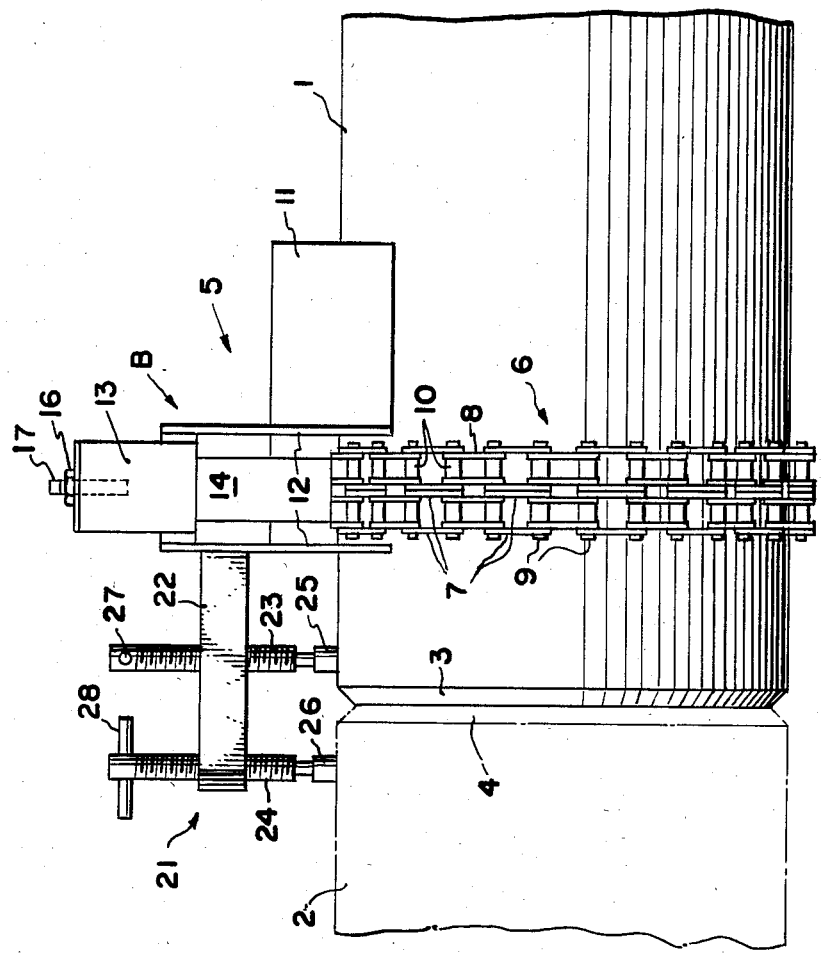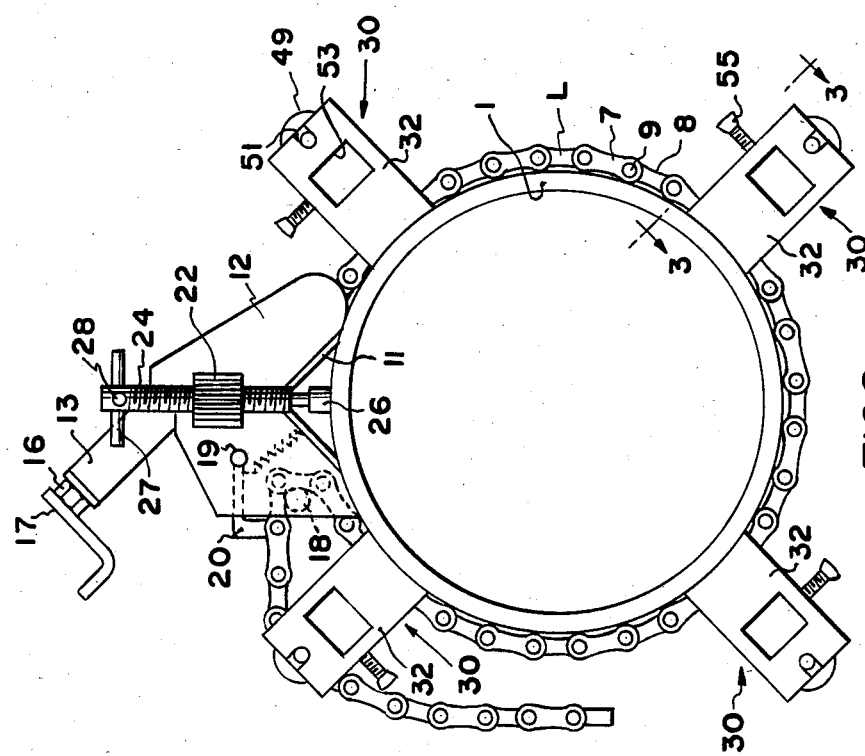

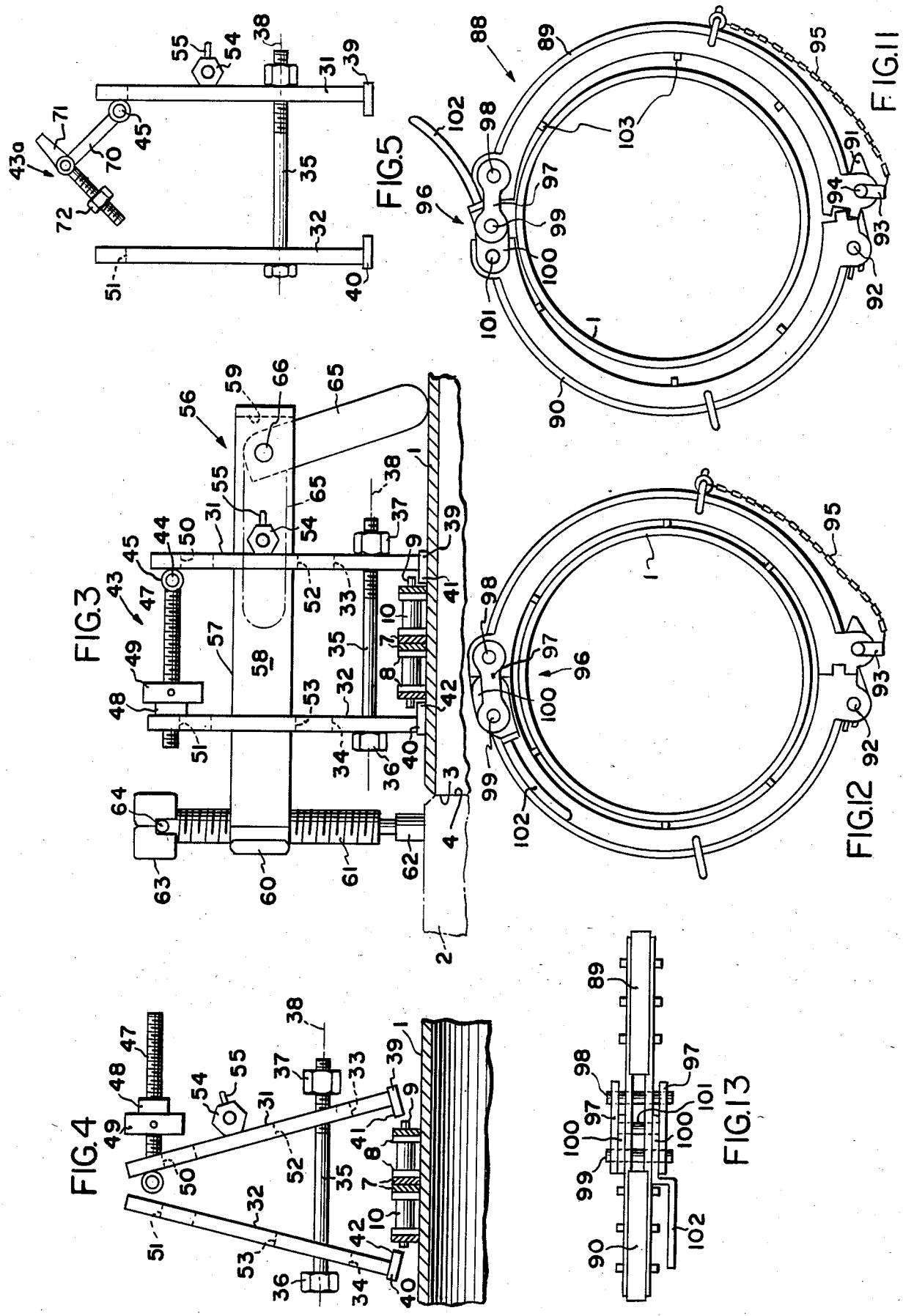

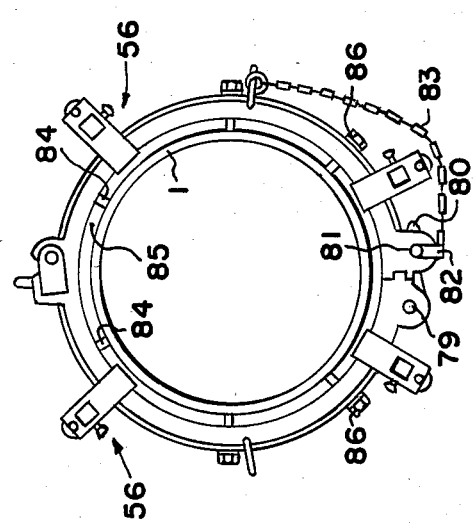
FIG.7
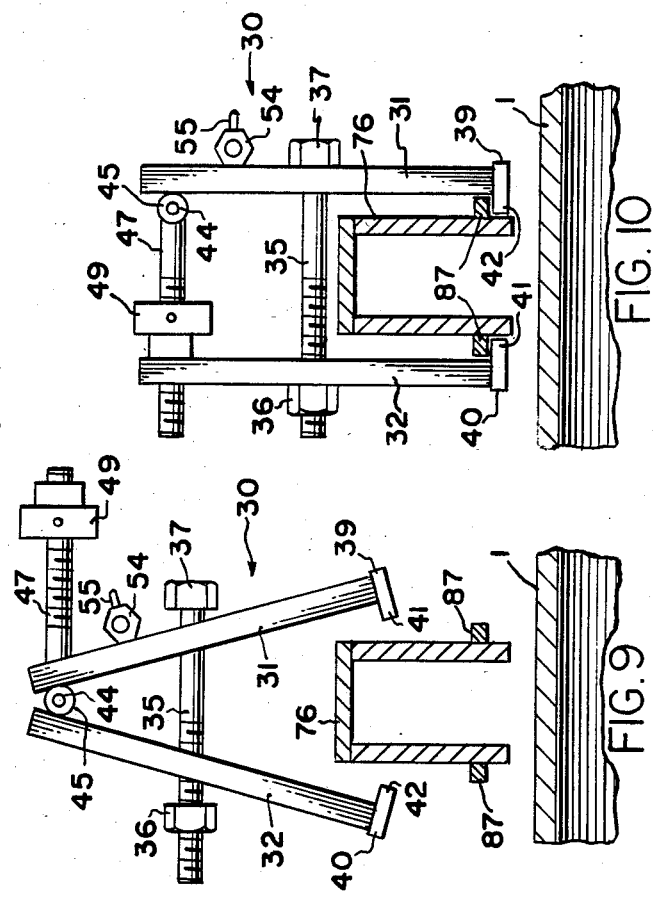
FIG.10
FIG.9
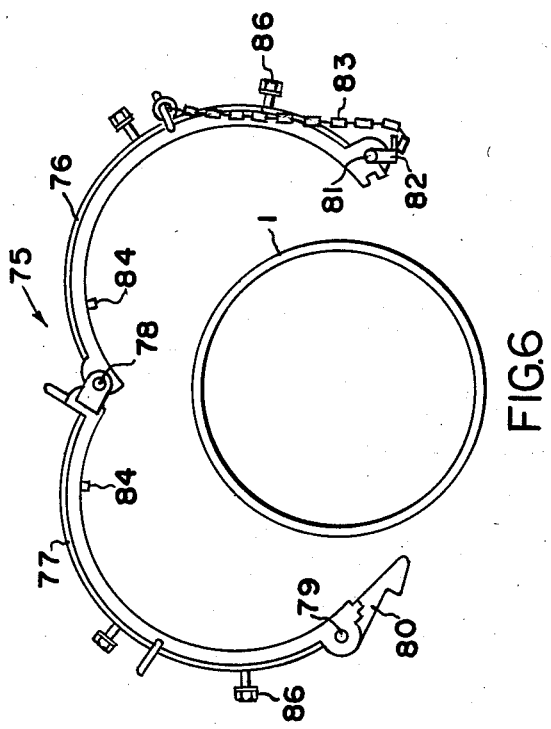
FIG.6
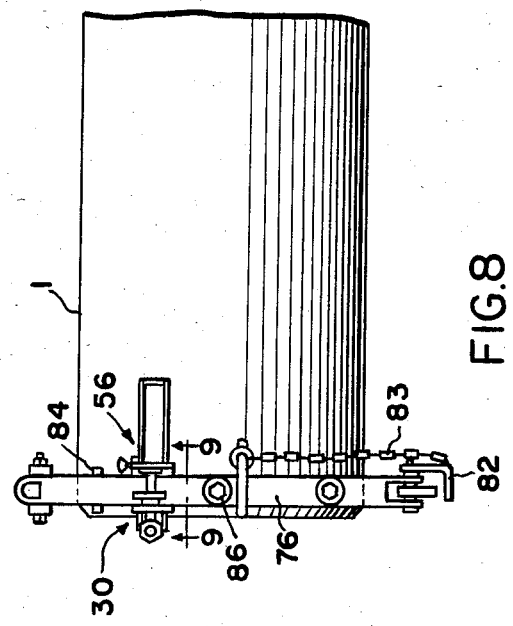
FIG.8

PIPE CLAMPS

BACKGROUND OF THE INVENTION

In the welding of one pipe section to another it is conventional to encircle one section with a clamp provided with a plurality of jacks which extend beyond the free end of the one pipe section and span the joint between the two pipe sections that are to be welded together. The jacks include jack screws which are adjustable radially of the clamp so as to move into engagagement with the second pipe section and support one end of the latter in confronting relation with the free end of the pipe section on which the clamp is mounted. The jack screws may be adjusted to align the second pipe section with the first pipe section and, in most cases, the jack screws may be adjusted so as to reform or reshape the configuration of the second pipe to match that of the first pipe. One pipe clamp construction of the kind described is disclosed in Dearman U.S. Pat. No. 3,653,574.

When preparing a clamp for use in aligning and reforming pipe sections the number of jacks that are required may vary considerably. For example, a clamp of the kind shown in the Dearman patent has the advantage of being usable with pipes of greatly differing diameters. Thus, three circumferentially spaced jacks may be adequate for use with pipes of relatively small diameter, but it may be necessary to use six or more jacks with pipes of larger diameter. Further, the number of jacks that may be required is dependent, to a large extent, on the extent of reformation which may be required to conform the confronting ends of the pipes. Thus, it may be necessary to provide more jacks for reforming than would be required for simply aligning two pipe sections.

When using a pipe clamp which is capable of accommodating pipes of greatly differing diameters, it has been the practice heretofore to fit the clamp with a number of jacks and apply the clamp somewhat loosely to one of the pipe sections. Thereafter, the individual jacks may be adjusted circumferentially of the pipe to the approximate positions they should occupy to enable the best results to be obtained. It is not always possible to locate the jacks initially as precisely as desired, so it often is necessary to adjust the jacks' positions. This necessitates loosening of the clamp and adjustment of the jacks, followed by retightening of the clamp. This procedure sometimes must be repeated several times before the jacks are positioned satisfactorily.

After a clamp has been fitted to one pipe section and the second pipe section is supported by the jacks in axial alignment with the first pipe section, it often occurs that there is a mismatch between the confronting surfaces of the two pipe sections. This may be due to differences in wall thicknesses or to an irregular bulge or indentation in one pipe wall. This mismatch commonly is referred to as a "hi-lo" condition, and such condition should be corrected as much as possible prior to welding operations. The best way in which to correct the hi-lo condition is by a jack which can act on one or the other of the pipe sections so as to eliminate or minimize the mismatch. However, in clamps of the kind in existence heretofore, an additional jack could not be applied to the clamp without loosening the latter. As a consequence, the alignment of the two pipes necessarily would be lost as a result of loosening of the clamp to enable it to accommodate another jack. Thus, considerable time has been taken up heretofore in aligning pipe sections and minimizing mismatches therebetween.

When using a clamp which carries a number of jacks that are intended to be spaced circumferentially about a pipe section when the clamp is applied, the combined weight of the clamp and jacks may be more than can be handled conveniently by one, or even two, workers. The handling of heavy clamps is fatiguing and, if more than one person is needed to apply a clamp to and remove it from a pipe section, the welding costs are increased. Further, the heavier the clamp the greater is the risk of injury to the person or persons using such clamp.

A principal object of the present invention is to provide a clamp construction which overcomes all of the problems referred to above.

SUMMARY OF THE INVENTION

A clamp according to one embodiment of the invention comprises a flexible chain which snugly may encircle one pipe section adjacent one end thereof and form a loop the size of which is adjustable so as to enable the clamp to accommodate a large number of different diameter pipe sections. Any desired number of jacks may be applied to the chain at any desired location on the loop, and after the chain has been secured to the pipe. The jacks extend beyond the end of the pipe to provide support for a second pipe that is to be welded to the first pipe. The jacks include jack screws that are adjustable radially of the clamp loop so as to shift the position of the second pipe transversely of the first pipe and locate the end of the second pipe in a predetermined position relative to the first pipe.

If it appears that the second pipe requires reforming so that the configuration of its end will conform as closely as possible to that of the adjacent end of the first pipe, one or more additional jacks may be applied to the clamp at selected locations so as to apply the necessary force at the optimum positions.

If the radial adjustment of any one or more of the jack screws necessitates relocation of a jack circumferentially of the clamp, it is a simple matter to release that jack from the clamp and readjust its position as required.

According to another embodiment of the invention the jacks are the same as those referred to earlier, but may be applied to a rim clamp or retainer composed of a pair of semi-circular segments pivoted at corresponding ends so as to encircle a pipe section. The other ends of the semi-circular segments are equipped with a releasable latch mechanism so as to enable the clamp to assume an annular configuration having a diameter corresponding substantially to that of the pipe. Again, the number and locations of jacks that may be applied to the clamp after it has been fitted to the pipe is variable according to need.

DESCRIPTION OF THE DRAWINGS

Apparatus constructed according to the invention is described in the following specification and illustrated in the accompanying drawings, in which:

FIG. 1 is a fragmentary, side elevational view of a clamp chain applied to a pipe section;

FIG. 2 is an end elevation, but illustrating jack supports fitted to the chain;

FIG. 3 is a sectional view taken on the line 3—3 of FIG. 2 and illustrating a jack bar fitted to a jack support;

FIG. 4 is a sectional view similar to FIG. 3, but omitting the jack bar and illustrating how the jack support is applied to and removed from the clamp chain;

FIG. 5 is an elevational view of a modified form of jack support;

FIG. 6 is an end elevation of a pipe and a rim clamp;

FIG. 7 is an end elevation illustrating the rim clamp applied to the pipe and also showing a number of jack supports fitted to the clamp;

FIG. 8 is a fragmentary, side elevational view illustrating a jack fitted to the rim clamp;

FIG. 9 is a sectional view taken on the line 9—9 of FIG. 8 and illustrating the manner of application of the jack support to the rim clamp, the jack bar being removed;

FIG. 10 is a view similar to FIG. 8, but illustrating the jack support clamped to the rim clamp;

FIG. 11 is an elevational view of a modified rim clamp;

FIG. 12 is a view similar to FIG. 11, but showing the clamp in an adjusted position; and FIG. 13 is a top plan view.

DETAILED DESCRIPTION

Apparatus constructed in accordance with each of the embodiments hereinafter described is adapted for use in welding a first pipe section 1 to a second pipe section 2, the two pipe sections having confronting ends 3 and 4, respectively, which may be beveled or otherwise suitably shaped. Prior to welding the two pipe sections to one another, they must be so located that their confronting ends are in a predetermined location and are maintained in such location until they are either tack or completely welded to each other. Apparatus constructed in accordance with the invention is especially adapted to perform these functions regardless of whether the second pipe section 2 is a cylindrical or other configured pipe, a fitting, a valve, or other device.

The embodiment of the invention illustrated in FIGS. 1-4 comprises a clamp 5 composed of a roller chain retainer 6 of predetermined length and formed of alternating groups of links 7 and 8 pivotally joined by pins 9 of such length as to extend beyond opposite sides of the chain. Rollers 10 are interposed between adjacent links. At one end of the chain is a block B having a V-shaped base 11 adapted to seat upon the outer surface of the pipe section 1 and to which is welded a pair of upstanding, spaced apart plates 12. Welded between the plates 12 is a hollow housing 13 in which is telescopingly accommodated a tube 14 that is welded at its outer end to one end of the chain 6. The sleeve 14 has fixed to its inner end a threaded nut (not shown) through which extends a correspondingly threaded shaft (not shown). The shaft also extends through a bearing 16 fitted onto the housing 13 and terminates at its outer end in an operating crank 17 by means of which the shaft may be rotated so as to effect extension or retraction of the sleeve 14 relative to the housing 13.

The opposite end of the chain 6 is free and is adapted to be threaded between the plates 12 and around a mandrel 18 which spans the two plates 12. The chain also passes between the mandrel 18 and a shaft 19 on which a latch 20 is mounted for releasable, latching engagement with the chain 6. The arrangement is such that the chain 6 may form a loop L having a diameter corresponding to that of the pipe 1, or any one of a number of other pipes of either lesser or greater diameter. Once the loop L has been formed around the pipe 1, the chain may be snugly clamped in place on the pipe adjacent its free end 3 by rotation of the crank 17 in such direction as to tension the chain 6.

It is preferred that the block B include a jack 21 comprising a bar 22 welded at one end to the adjacent plate 12 and being of such length as to project beyond the free end 3 of the pipe 1 when the chain 6 is clamped thereon. The jack 21 also preferably includes a pair of threaded jack screws 23 and 24 extending through threaded openings in the bar 22 for adjustment radially of the loop L. The jack screw 23 has a swivel foot 25 for engagement with the pipe section 1 and the jack screw 24 has a similar swivel foot 26 for engagement with the pipe 2. Operating handles 27 and 28 may be fitted to the opposite ends of the screws 23 and 24, respectively, to facilitate their rotation.

Following clamping of the chain 6 onto the pipe section 1 a suitable number of jack supports 30 may be applied to the chain circumferentially of the loop L. Each support 30 is identical and comprises a pair of legs 31 and 32 having aligned, elongate slots 33 and 34 for the loose accommodation of a coupling bolt 35 having a head 36 at one end and an adjustable nut 37 at its other end. The legs 31 and 32 thus may be rocked about a fulcrum 38 formed by the bolt 35, and the maximum spacing between the legs is adjustable by means of the nut 37 to enable the support to be adaptable to chains of different widths.

At one end of the leg 31 is welded a gripper or flange 39 and a similar gripper or flange 40 is welded to the corresponding end of the leg 32. The grippers 39 and 40 have fingers 41 and 42, respectively, which extend beyond the associated leg toward each other. The free ends of the legs and the grippers preferably are concave but the concavity need not match the curvature of the pipe.

Operating means for effecting rocking movements of the legs about the fulcrum 38 is designated generally by the reference character 43 and, in one embodiment, comprises a shaft 44 rotatably accommodated in a sleeve 45 that is welded to the leg 31 adjacent one end thereof. The sleeve 45 has a semi-circular slot (not shown) therein through which extends one end of a threaded mounting member 47 that is fixed to the shaft 44. Threaded onto the rod 47 is an actuator 48 to which is fixed an enlarged head 49 to facilitate rotation of the actuator 48. The leg 31 also is provided with a slot 50 adjacent the sleeve 45 and the leg 32 is provided with a corresponding slot 51. The mounting member 47 thus may be accommodated in the slot 50, as is shown in FIG. 4, or in the slot 51, as is shown in FIG. 3. When the member 47 is accommodated in the slot 51, rotation of the head 49 in such direction as to cause the actuator 48 to move toward the leg 32 will result in rocking of the legs 31 and 32 about the fulcrum 38 in such directions as to cause the grippers 39 and 40 to move toward one another, and, as long as the actuator 48 is maintained in engagement with the leg 32, the grippers 39 and 40 cannot move away from each other. Locating the actuator 48 radially outwardly of the fulcrum facilitates operation of the actuator.

The leg 31 has an opening 52 between its ends and the leg 32 has a similar opening 53 in register with the opening 52. The leg 31 also preferably has a nut 54 welded thereto and through which extends a threaded set screw 55.

Each support 30 is adapted to accommodate a jack 56 comprising an elongate body 57 having spaced, parallel side rails 58, an end rail 59 at one end of the body, and a threaded nut 60 fixed between the rails 58 at the opposite end of the body. Extending through the nut 60 is a correspondingly threaded jack screw 61 having a swivel foot 62 at one end and a head 63 and a handle 64 at its opposite end to facilitate rotation. At the opposite end of the body 57 is a stabilizer bar 65 positioned between the rails 58 and pivoted thereto by means of a pin 66. The stabilizer bar 65 is rockable counterclockwise about the axis of the pivot 66 from a retracted position substantially within the confines of the body to an extended position as shown in FIG. 3. Further counterclockwise movement is precluded by engagement of the bar 65 with the end rail 59.

The cross-sectional area of the body 57 is slightly less than the area of each of the openings 52 and 53 in the legs of the support 30. Thus, the stabilizer bar 65 may be rocked to its retracted position and the body 57 slid through the openings in the legs 31 and 32, following which the stabilizer bar 65 may be swung to its extended position. The body 57 then may be adjusted longitudinally to a desired position and the set screw 55 turned to engage the adjacent rail 58 and latch the body in that position.

In the operation of the apparatus thus far described, the chain 6 is clamped onto the pipe section 1 in the manner described earlier. Thereafter, a number of supports 30 may be fitted to the chain. In each case, the legs 31 and 32 will be rocked about their fulcrum 38 so as to cause the grippers 39 and 40 to be spread apart a distance sufficient to enable the legs 31 and 32 to straddle the chain as is shown in FIG. 4. The operating means 43 then may be manipulated so as to cause the grippers 39 and 40 to move toward one another as is shown in FIG. 3. The height of the gripper fingers 41 and 42 is somewhat less than the distance between the pivot pins 9 and the outer surface of the pipe 1, thereby enabling the gripper fingers 41 and 42 to grip the chain in a position between the pins 9 and the outer surface of the pipe.

The number of supports 30 fitted to the chain 6 may vary, but a sufficient number should be applied and spaced circumferentially of the loop L to provide adequate support for the second pipe section 2, and the spacing between adjacent supports 30 should be such as to provide for the application of adequate shifting and reforming forces on the pipe section 2, as will be explained.

Following the application of the supports to the chain 6, the jacks 56 may be fitted to the supports 30 via the openings 52 and 53 and the respective bodies 57 adjusted axially of the pipe 1 so that the jack screws 61 extend beyond the free end 3 of the pipe 1. The end 4 of the pipe 2 then may be moved into confronting relation with the free end 3 of the pipe 1, following which the jack screws 61 may be adjusted radially of the loop L to engage the outer surface of the pipe 2 at circumferentially spaced points. The several jack screws, including the jack screw 24, may be manipulated to shift the pipe 2 transversely of the pipe 1 to align the two pipe sections 1 and 2 axially. Any tendency on the part of a jack body 57 to tilt is resisted by the engagement of the support 30 with the chain 6 and by the engagement of the leg 65 with the pipe 1.

After the pipe sections 1 and 2 have been aligned, or substantially aligned, the individual jack screws 61 may be adjusted to conform the configuration of the end 4 of the pipe 2 to the end 3 of the pipe 1. If the number of jacks is insufficient to enable proper reformation of the pipe end 4, additional jacks may be applied to the chain 6 at any desired location around the loop L so as to enable forces to be applied to the pipe 2 as may be required to correct as much as possible any mismatch that may be present. Since any support 30 may be adjusted circumferentially of the loop L without necessitating slackening of the chain 6, and since each jack body 57 is adjustable axially of the pipes without necessitating slackening of the chain, the jack screws may be adjusted so as to apply force at any selected point on either of the pipes 1 and 2.

The clamp may be separated from the pipe 1 following the completion of welding operations by removal of some or all of the jacks from the chain 6 or by release of the latch 20 and removal of the free end of the chain from between the plates 12.

The embodiment of the invention shown in FIG. 5 corresponds to the previously described embodiment with the exception that the operating means 43a comprises a toggle linkage. In the modified embodiment the toggle linkage includes a mounting member 70 secured at one end to the shaft 45 and pivoted at its other end to a threaded rod 71 on which a linearly adjustable actuator 72 is threaded. The free end of the rod 71 may be accommodated in the slot 51 in the support leg 32 and the actuator 72 adjusted so that it will bear against the leg 32. Manipulation of the linkage in such manner as to expand it causes the legs 31 and 32 to rock about the fulcrum 38 and the grippers 39 and 40 to be clamped against opposite sides of the chain 6.

The embodiment of the invention illustrated in FIGS. 6–10 comprises a rim clamp retainer 75 composed of a pair of arcuate segments 76 and 77 pivoted to one another at corresponding ends by a pivot pin 78. At the other end of the segment 76 is pivoted, as at 79, a latching pawl 80 that is adapted to be engaged by an adjustable cam (not shown) forming part of a latch pin 81 and which may be rocked out of engagement with the latch pin 81 by means of a release arm 82 that is fixed to the pin and coupled to an operating chain 83. The latching and release mechanism is known.

Adjacent the pivotally joined ends of the segments 76 and 77 each of the latter preferably has welded thereto one or more radially inwardly extending projections 84 which may engage the outer surface of the pipe section 1 when the segments 76 and 77 encircle the pipe. This will provide an annular space 85 between the outer surface of the pipe 1 and the inner surface of the clamp 75.

Each segment 76 and 77 also may be provided with a number of threaded jack screws 86 which extend through correspondingly threaded openings in the clamp segments and which may be used to reform the free end of the pipe 1.

The rim clamp 75 is adapted to accommodate a plurality of supports 30 and jacks 56 like those referred to earlier. In this case the supports 30 are mounted on the ring segments by inserting the gripper fingers 41 and 42 in the annular space between the pipe surface and the inner surface of the clamp, as is shown in FIG. 9. The operation of the supports 30 and jacks 56 in conjunction with the clamp 75 is the same as has been described earlier.

If it should be desired to provide the segments 76 and 77 of the ring clamp with laterally extending ribs or flanges 87, as is shown in FIGS. 9 and 10, then the grippers of the support 30 may grip the segments radially inwardly of the ribs, rather than occupy positions between the clamp ring and the pipe surface.

The embodiment shown in FIGS. 11–13 comprises a rim clamp retainer 88 similar to the clamp 75 in that it is composed of two arcuate segments 89 and 90 having at corresponding ends a latching pawl 91 pivoted to the segment 90 by a pivot pin 92. A release arm 93 pivoted to the segment 89 as at 94 is operable to release the latch pawl 91 when the arm 93 is rotated in one direction by the application of force on an operating chain 95.

The segments 89 and 90 are not simply pivoted to one another at their other ends, as is the case with the segments 76 and 77 of the clamp 75. Instead, the segments 89 and 90 are coupled to one another by an overcentering latch mechanism 96 having a pair of links 97 joined at corresponding ends to a pivot 98 carried by the segment 89 and pivoted at their other ends to pins 99 that are fixed to and project outwardly from a pair of links 100. The links 100 are pivoted to a pin 101 carried by the segment 90. To one end of one of the links 100 is fixed one end of an operating arm 102 which may be pivoted counterclockwise about the pin 101 from the position shown in FIG. 11 to the position shown in FIG. 12 so as to draw the confronting ends of the segments 89 and 90 toward one another.

The clamp 88 includes a number of fixed, circumferentially spaced, radially inwardly extending projections 103 like the projections 84. If desired, the clamp 88 also may include threaded, reforming jack screws like the jack screws 86 fitted to the clamp 75.

It will be understood that the clamp 88 may be fitted with removable jack supports and jacks like those described earlier. As is shown in FIG. 13, the operating arm 102 of the toggle mechanism 96 is spaced to one side of the segments. The spacing is sufficient to enable a jack screw 61 to extend between the segment 90 and the arm 102 when the clamp is clamped around the pipe section 1.

One advantage of the overcentering latch mechanism 96 is that it enables the clamp 88 to be applied to and removed from a pipe length more quickly than is the case with the clamp 75. This is because the latch mechanism 96 may be used to provide some slack or annular clearance between the clamp 88 and the pipe section 1 so as to provide sufficient working space for the latch pawl 91 to seat upon and be unseated from its latch pin and without having to make any radial adjustment of the radially adjustable jack screws 86. As a consequence, these jack screws need not be adjusted once they have been set.

A further advantage of the latch mechanism 96 is that it enables all of the jack screws 86 to be dispensed with, if desired, in favor of the more economical fixed projections 103.

The disclosed embodiments are representative of presently preferred forms of the invention, but are intended to be illustrative rather than definitive thereof. The invention is defined in the claims.

I claim:

1. A jack construction adapted for removable attachment to a pipe clamp forming a loop and encircling a first pipe section adjacent one end thereof, said construction comprising support means having a pair of relatively movable legs spaced apart a distance sufficient to straddle said clamp, said legs terminating at corresponding ends in spaced gripping members confronting one another; operating means operable to effect relative movement of said legs in directions to cause said gripping members to move toward and away from one another to engage and disengage said clamp on opposite sides thereof, an elongate body; means mounting said body on said support means with the ends of said body extending beyond said legs, said body being of such length as to overlie a portion of said first pipe section and extend beyond said one end thereof; adjustable force applying means carried by said body at one end thereof for adjustment radially of said loop into and out of engagement with a second pipe section adjacent and confronting said one end of said first pipe section; and stabilizer means mounted on said body at its other end for movements between a retracted position substantially within the confines of said body to a projected position beyond said body for engagement with said first pipe section.

2. A jack construction according to claim 1 wherein said legs are pivotal relative to said support means and wherein said operating means comprises a toggle linkage.

3. A jack construction according to claim 2 wherein said toggle linkage is interposed between said legs.

4. A jack construction according to claim 1 wherein said legs are pivotal relative to said support means and wherein said operating means comprises a mounting member connected at one end to said support means and having a movable actuator movable toward and away from said one end into and out of engagement with one of said legs.

5. A jack construction according to claim 1 wherein said stabilizer means is pivoted on said body.

6. A jack construction according to claim 1 wherein said force applying means comprises a screw in threaded engagement with said body.

7. A jack construction according to claim 1 wherein said support means is open and said body extends slideably through said support means.

8. A pipe clamp construction for supporting first and second pipe sections in end-to-end confronting relation, said construction comprising a clamping chain forming a loop of such size as snugly to encircle one of said pipe sections, said chain comprising links joined to one another circumferentially of said loop by pins that lie between the radially inner and outer surfaces of said links and extend transversely beyond said links; a plurality of jacks removably connected to said chain at intervals spaced circumferentially of said loop, each of said jacks having a pair of legs straddling said chain and terminating at corresponding ends in grippers confronting opposite sides of said chain, each of said grippers being of such height radially of said loop as to be accommodated between the adjacent pins and the radially outer surface of said one pipe section; operating means for moving said grippers toward and away from one another into and out of clamping engagement with said chain; a body carried by said legs and extending axially of said loop a distance to span the joint between said first and second pipe sections; an adjustable force applying member carried by said body at one end of the latter for movements radially of said loop into and out of engagement with said second pipe section; and stabilizing means carried by said body at the other end of the latter and extending in a direction to engage said first pipe section, any of said jacks being attachable to and removable from said chain without necessitating slackening of the latter.

9. A pipe clamp construction according to claim 8 wherein said legs of each of said jacks are rockable about a fulcrum located between the radially inner and outer ends of said legs, and wherein said operating means act on said legs between said fulcrum and the radially outer ends of said legs.

10. A pipe clamp construction according to claim 9 wherein said operating means comprises a toggle linkage.

11. A pipe clamp construction according to claim 9 wherein said operating means comprises a linearly movable actuator.

12. A pipe clamp construction according to claim 8 wherein said stabilizing means is pivotal for movement from a projected position beyond the confines of said body to a retracted position substantially within the confines of said body.

13. A pipe clamp construction for supporting first and second pipe sections in end-to-end confronting relation, said construction comprising a retainer forming a loop of such size as snugly to encircle one of said pipe sections adjacent one end thereof with a substantial portion of its circumferential length in engagement with said one of said pipe sections; extensions carried by said retainer circumferentially thereof and projecting laterally of said loop, each of said extensions lying between the radially inner and outer edges of said retainer; a plurality of jacks removably coupled to said retainer at intervals spaced circumferentially of said loop, each of said jacks having a pair of legs straddling said retainer and terminating at corresponding ends in grippers confronting one another, each of said grippers being of such height radially of said loop as to be accommodated between the adjacent extensions and the radially outer surface of said one pipe section; operating means for moving said grippers toward and away from one another into and out of clamping engagement with opposite sides of said retainer; a body carried by the legs of each of said jacks and extending axially of said loop a distance to span the joint between said first and second pipe sections; an adjustable force applying member carried by each of said bodies at one end thereof for movements radially of said loop into and out of engagement with said second pipe section; and stabilizing means carried by each of said bodies at the other end thereof for engagement with said first pipe section, any of said jacks being attachable to and removable from said retainer without necessitating adjustment of the diameter of said loop.

14. A pipe clamp construction for supporting first and second pipe sections in end-to-end confronting relation, said construction comprising a clamping chain forming a loop of such size as snugly to encircle one of said pipe sections; projections carried by said chain circumferentially of said loop, said projections lying between the radially inner and outer surfaces of said chain and extending transversely beyond opposite sides of said chain; a plurality of jacks removably connected to said chain at intervals spaced circumferentially of said loop, each of said jacks having a pair of legs straddling said chain and terminating at corresponding ends in grippers confronting opposites sides of said chain, each of said grippers being of such height radially of said loop as to be accommodated between the adjacent projections and the radially outer surface of said one pipe section; operating means for moving the grippers of each of said jacks toward and away from one another into and out of clamping engagement with said chain; a body carried by the legs of each of said jacks and extending axially of said loop a distance to span the joint between said first and second pipe sections: an adjustable force applying member carried by each of said bodies at one end of the latter for movements radially of said loop into and out of engagement with said second pipe section; and stabilizing means carried by said body at the other end of the latter and extending in a direction to engage said first pipe section, any of said jacks being attachable to and removable from said chain without necessitating slackening of the latter.

15. A pipe clamp construction according to claim 14 wherein each of said bodies is slideably supported in its respective jack for sliding adjustment axially of said loop.

16. A pipe clamp construction according to claim 15 including means carried by each of said jacks for releasably retaining the associated body in a selected position of adjustment axially of said loop.

17. A pipe clamp construction according to claim 14 wherein the legs of each of said jacks are rockable about a fulcrum located between the radially inner and outer ends of said legs, and wherein said operating means acts on said legs between said fulcrum and the radially outer ends of said legs.

18. A pipe clamp construction according to claim 14 wherein said operating means comprises a toggle linkage.

19. A pipe clamp construction according to claim 14 wherein said operating means comprises a linearly adjustable screw threaded actuator.

20. A pipe clamp construction according to claim 14 wherein said stabilizing means is pivoted for movement from a projected position beyond the confines of said body to a retracted position substantially within the confines of said body.

* * * * *